(12) United States Patent
Hofsommer

(10) Patent No.: US 10,047,615 B2
(45) Date of Patent: Aug. 14, 2018

(54) METHOD OF MOUNTING ROTOR BLADES ON A ROTOR DISK, AND CLAMPING DEVICE FOR PERFORMING SUCH A METHOD

(71) Applicant: Siemens Aktiengesellschaft, Munich (DE)

(72) Inventor: Daniel Hofsommer, Teltow (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 15/539,289

(22) PCT Filed: Dec. 8, 2015

(86) PCT No.: PCT/EP2015/078905
§ 371 (c)(1),
(2) Date: Jun. 23, 2017

(87) PCT Pub. No.: WO2016/113041
PCT Pub. Date: Jul. 21, 2016

(65) Prior Publication Data
US 2017/0350262 A1 Dec. 7, 2017

(30) Foreign Application Priority Data
Jan. 12, 2015 (EP) .................................. 15150757

(51) Int. Cl.
*F01D 5/32* (2006.01)
*F01D 5/30* (2006.01)
(Continued)

(52) U.S. Cl.
CPC .............. *F01D 5/326* (2013.01); *B23P 19/02* (2013.01); *F01D 5/3007* (2013.01); *B23P 15/006* (2013.01); *B23Q 3/063* (2013.01)

(58) Field of Classification Search
CPC ........ F01D 5/326; F01D 5/3007; B23P 19/02; B23P 15/006; B23Q 3/063
See application file for complete search history.

(56) References Cited

U.S. PATENT DOCUMENTS 3,328,867 A * 7/1967 Guengant ............... F01D 5/225
29/889.21
4,765,046 A * 8/1988 Partington ............ B23P 15/006
29/889.21
(Continued)

FOREIGN PATENT DOCUMENTS

JP 2007064074 A 3/2007
WO 2010040338 A1 4/2010

OTHER PUBLICATIONS

International Search Report dated Mar. 4, 2016, for PCT/EP2015/078905.
(Continued)

*Primary Examiner* — Woody Lee, Jr.
*Assistant Examiner* — Adam W Brown
(74) *Attorney, Agent, or Firm* — Beusse Wolter Sanks & Maire

(57) ABSTRACT

A method for mounting rotor blades on a rotor disk along a predetermined pitch circle diameter in such a way that adjacent rotor blades, when properly mounted on the rotor disk and in the cold state, are clamped against each other with a predetermined preload. A clamping device which performs such a method has a plurality of clamping elements which are arranged in a uniformly distributed manner around a central axis, the number of which corresponds to the number of rotor blades to be mounted on the rotor disk and which in each case are designed for the locating of a rotor blade, wherein the clamping elements are moveable radially, exerting a radially inwardly directed force.

9 Claims, 4 Drawing Sheets

(51) Int. Cl.
*B23P 19/02* (2006.01)
*B23Q 3/06* (2006.01)
*B23P 15/00* (2006.01)

(56) References Cited

U.S. PATENT DOCUMENTS

| | | | | |
|---|---|---|---|---|
| 7,182,577 | B2 * | 2/2007 | Yamashita | F01D 5/225 29/889.21 |
| 8,277,186 | B2 * | 10/2012 | Tanaka | F01D 5/225 415/220 |
| 8,662,852 | B2 * | 3/2014 | Bhokardole | F01D 5/3007 416/218 |
| 9,422,820 | B2 * | 8/2016 | Pieri | F01D 5/326 |
| 9,689,268 | B2 * | 6/2017 | Deallenbach | F01D 5/225 |
| 2006/0002798 | A1 * | 1/2006 | Ooishi | F01D 5/225 416/244 R |

OTHER PUBLICATIONS

EP Search Report dated Jul. 2, 2015, for EP patent application No. 15150757.1.

\* cited by examiner

METHOD OF MOUNTING ROTOR BLADES ON A ROTOR DISK, AND CLAMPING DEVICE FOR PERFORMING SUCH A METHOD

CROSS REFERENCE TO RELATED APPLICATIONS

This application is the US National Stage of International Application No. PCT/EP2015/078905 filed Dec. 8, 2015, and claims the benefit thereof. The International Application claims the benefit of European Application No. EP15150757 filed Jan. 12, 2015. All of the applications are incorporated by reference herein in their entirety.

FIELD OF INVENTION

The present invention relates to a method for mounting rotor blades on a rotor disk along a predetermined pitch circle diameter in such a way that shrouds of adjacent rotor blades mounted on the rotor disk in the intended manner and in the cold state are clamped against each with a predetermined pretension. Furthermore, the present invention relates to a clamping device for performing such a method.

BACKGROUND OF INVENTION

Rotor disks with rotor blades mounted thereon are known in the prior art in a wide variety of embodiments. They are used for example in gas turbines. The rotor blades have in each case a blade root, a blade airfoil and an outer shroud and are fastened on the rotor disk along a predetermined pitch circle diameter in a uniformly distributed manner. To this end, the blade roots are located in locating slots which are formed in the rotor disk.

During operation, the blade airfoils are subjected to dynamic loads, which can lead to harmful vibrations and to fatigue during high load cycles. This especially applies to long, slender blade airfoils, the natural frequencies of which during the turbine operation frequently lie with the range of the excitation frequencies. This problem can consequently be counteracted by shrouds of adjacent rotor blades being interconnected by means of corresponding connecting elements and being clamped against each other in the cold state. In this way, at low rotational speeds a close contact between the shrouds can be ensured and the natural frequency can be correspondingly manipulated. The pretension can be achieved for example by the rotor blades being twisted with regard to their longitudinal axis during their mounting. To this end, the blade roots of the rotor blades are inserted for example by a few millimeters into the blade root locating slots of the rotor disks and then with a hammer or a press are forced all around into the blade root locating slots. On account of the forces which are required for creating the pretension, limits are set to this method, however, with regard to the degree of achievable pretension.

SUMMARY OF INVENTION

Starting from this prior art, it is an object of the present invention to create an alternative method of the type referred to in the introduction and also to create a clamping device for performing such a method.

For achieving this object, the present invention creates a method of the type referred to in the introduction which features the consecutive steps:

a) mounting each rotor blade on an associated clamping element of a clamping device in such a way that the rotor blades are arranged along a first pitch circle diameter which is larger than the predetermined pitch circle diameter, wherein the shrouds of the rotor blades which are retained on the clamping elements are not clamped against each other or with a pretension which is lower than the predetermined pretension, b) moving the clamping elements radially inward until the rotor blades are arranged along a second pitch circle diameter which corresponds to the predetermined pitch circle diameter, wherein the shrouds of the rotor blades are clamped against each other during the radial inward movement of the clamping elements until achieving the predetermined pretension, and c) mounting the rotor blades on the rotor disk in that state in which the shrouds of the rotor blades are clamped against each other with the predetermined pretension.

In other words, in a first step the rotor blades are mounted on clamping elements of a separate clamping device along a first pitch circle diameter which is larger than the pitch circle diameter with which the rotor blades are to be finally mounted on the rotor disk. The mounting is advantageously carried out in such a way that the shrouds of the rotor blades which are retained on the clamping elements are not clamped against each other at all. Accordingly, the mounting of the rotor blades on the associated clamping elements can be carried out in a simple manner. Alternatively, it is also possible, however, to mount the shrouds for the rotor blades on the associated clamping elements with a pretension which is lower the predetermined pretension. In this way, the mounting of the rotor blades on the clamping device is at least made easier compared with a direct mounting of the rotor blades on the rotor disk. In step b), the rotor blades which are retained on the clamping device are then clamped against each other with predetermined pretension, while they are moved radially inward from the first pitch circle diameter in the direction of the second pitch circle diameter which corresponds to the predetermined pitch circle diameter with which the rotor blades are to be mounted along the rotor disk. During this movement, the shrouds of the adjacently arranged rotor blades are pressed against each other with increasing pressure, as a result of which the desired pretension is achieved. In step c), the mounting of the rotor blades on the rotor disk is then carried out in that state in which their shrouds are clamped against each other with the predetermined pretension. In other words, in step c) the rotor blades are moved from the clamping device onto the rotor disk.

According to one embodiment of the method according to the invention, the predetermined pretension in step c) is created at least partially by a torsional movement of the rotor blades around their longitudinal axis. In this way, a firm hold between the shrouds of the rotor blades is achieved. Such a torsional movement can for example be brought about by a basically axially extending middle line of a radially inner region and a basically axially extending middle line of a radially outer region of each rotor blade being produced with a specific offset which is then compensated in step b), creating a torsional stress.

Each rotor blade advantageously comprises a blade root, wherein the rotor disk and the clamping elements have in each case blade root locating slots which are designed to correspond to the blade roots and which after carrying out step b) can be arranged in alignment with each other in such a way that the rotor blades which are retained on the clamping elements can be pushed out of the blade locating slots of the clamping device into the blade locating slots of the rotor disk in step c). Accordingly, the rotor blades can be pushed from the clamping device onto the rotor disk in a comparatively simple manner.

According to one embodiment of the present invention, the shrouds of adjacent rotor blades on their radial end faces pointing toward each other are provided with corresponding connecting elements which can be brought into engagement with each other in the radial direction and define an undercut in the axial direction. As a result of such a connection of adjacent shrouds, the holding together of the rotor blades in the mounted state is further improved. Also, the natural frequency of the rotor blades during the intended operation can be additionally manipulated in this way. Furthermore, such connections can also support the creation of the predetermined pretension.

Corresponding connecting elements are advantageously formed by a projection and a recess which is designed to correspond to the projection. In this way, a simple construction is achieved.

The projection advantageously extends in each case over the entire axial width of a shroud and in particular has the shape of an arrow point pointing in the circumferential direction.

For achieving the object stated in the introduction, the present invention also creates a clamping device for implementing a method according to the invention which has a plurality of clamping elements which are arranged in a uniformly distributed manner around a central axis, the number of which corresponds to the number of rotor blades which are to be mounted on the rotor disk and which in each case are designed for the locating of a rotor blade, wherein for carrying out step b) the clamping elements can be moved radially, exerting a radially inwardly directed force.

The clamping elements are advantageously provided with blade root locating slots which are designed in each case for locating a blade root of a rotor blade.

Provision is advantageously made for at least one locking device which is designed for locking the clamping elements which are arranged along the second pitch circle diameter.

BRIEF DESCRIPTION OF THE DRAWINGS

Further features and advantages of the present invention become clear based on the following description of an exemplary embodiment of the method according to the invention with reference to the attached drawing. In the drawing

DETAILED DESCRIPTION OF INVENTION

The subsequently described method according to an embodiment of the present invention serves for mounting rotor blades 1 on a rotor disk 2 along a predetermined pitch circle diameter D in such a way that shrouds of adjacent rotor blades 1 mounted on the rotor disk 2 in the intended manner and in the cold state are clamped against each other with a predetermined pretension, for which a clamping device 4 having a clamping elements 3 is used according to the invention.

Figure 1:
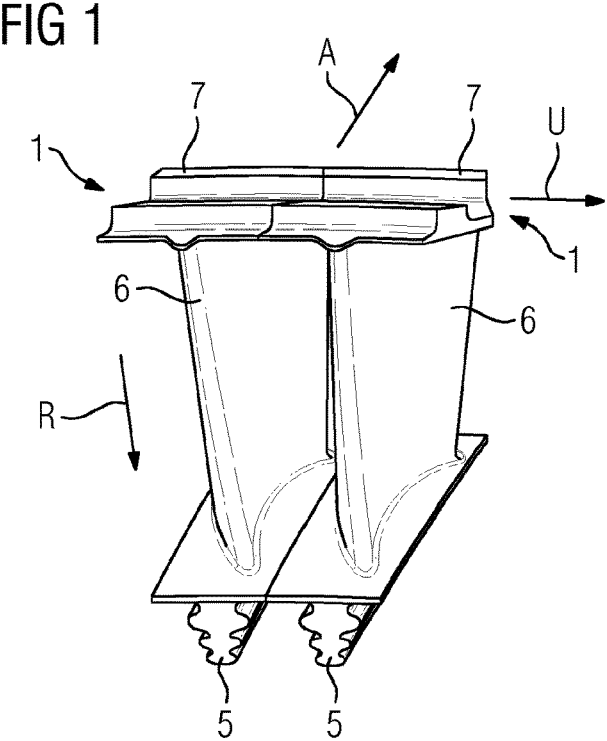
FIG. 1 shows a perspective view of two adjacently arranged rotor blades.
Figure 2:
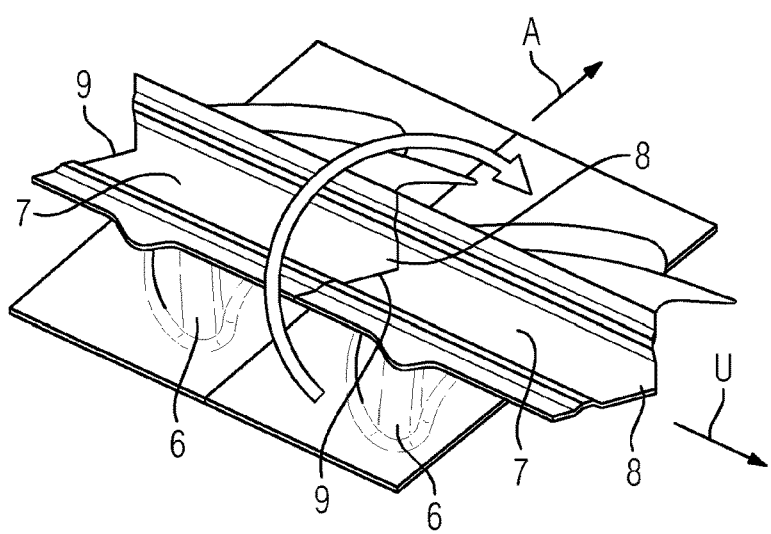
FIG. 2 shows an enlarged schematic view of two shrouds of the rotor blades which are shown in FIG. 1.
Figure 3:
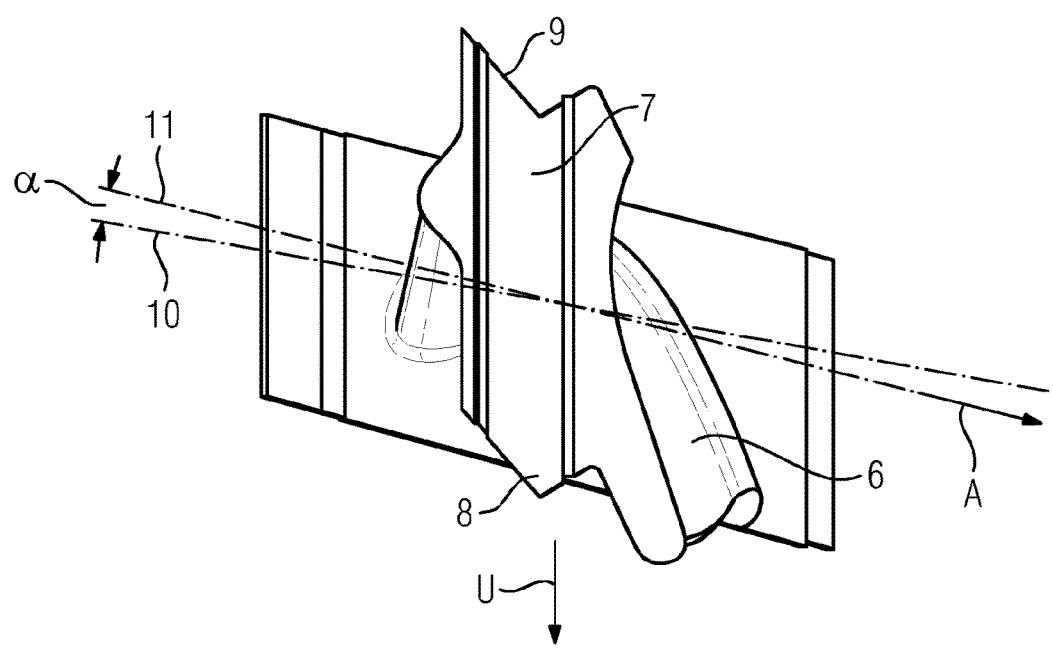
FIG. 3 shows an enlarged schematic view of an individual shroud of the rotor blades which are shown in FIG. 1.

The rotor blades 1 comprise in each case in a known manner a blade root 5, a blade airfoil 6 and a shroud 7. The shrouds 7 of adjacent rotor blades 1 are provided on their radial end faces pointing toward each other with corresponding connecting elements which are brought into engagement with each other in the radial direction R and define an undercut in the axial direction A. In the present case, the connecting elements are formed by projections 8 on the one hand and on the other hand by recesses 9 which are designed to correspond to the projections 8, wherein the projections 8 and the recesses 9 extend in each case over the entire axial width of a shroud 7 and are provided in the form of an arrow point which points in the circumferential direction U. The rotor blades 1 are produced in such a way there is a specific angled offset between a middle line 10 of the blade root 5 extending basically in the axial direction A, which middle line is projected onto the shroud 7 in FIG. 3, and a middle line 11 of the shroud 7 extending basically in the axial direction, which middle line is drawn in as the angle α in FIG. 3.

The rotor disk 2 is provided in a known manner along its circumference with a multiplicity of blade root locating slots 12 which are arranged at equal distances from each other on the predetermined pitch circle diameter D and serve in each case for the locating of a blade root 5 of a rotor blade 1.

Figure 4:
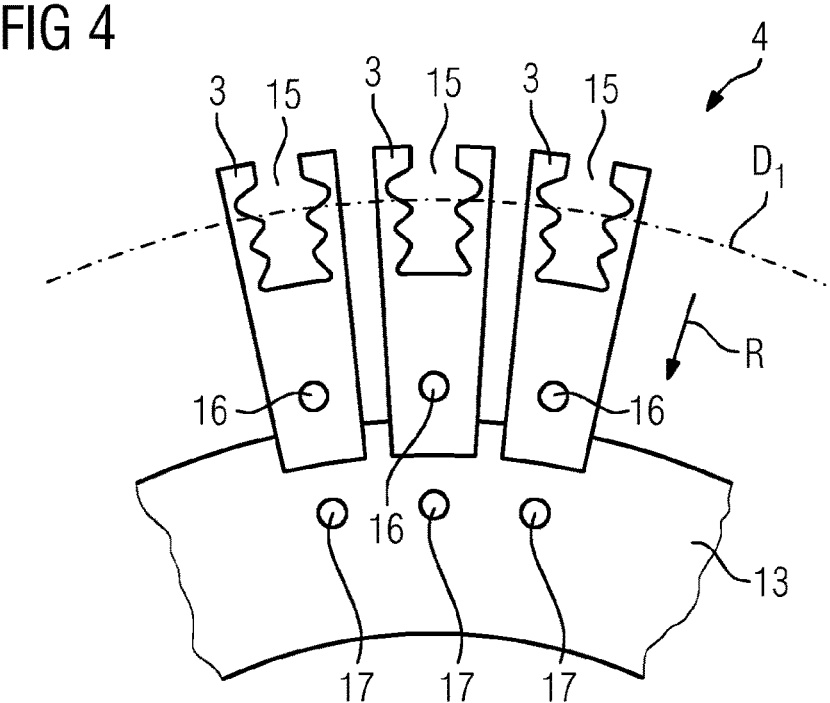
FIG. 4 shows a schematic side view of a section of a clamping device, the clamping elements of which are located in a first position.
Figure 5:
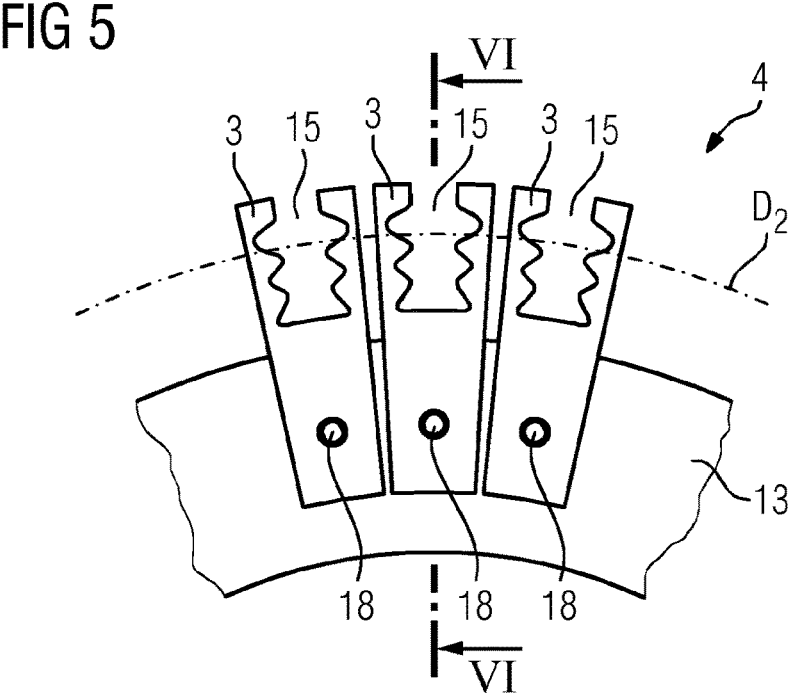
FIG. 5 shows a schematic side view of the clamping device shown in FIG. 4, the clamping elements of which are located in a second position.
Figure 6:
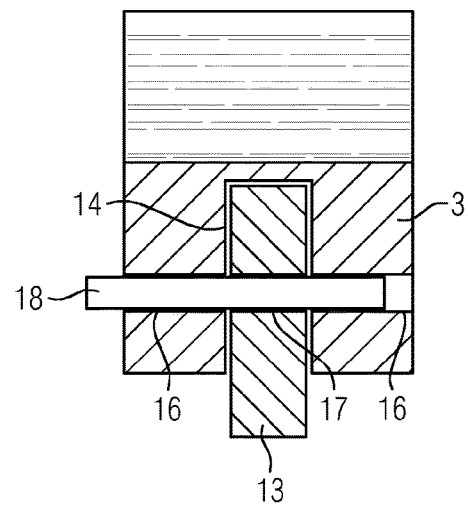
FIG. 6 shows a cross-sectional view along the line VI-VI in FIG. 5.

The clamping device 4 comprises a guide ring 13, along the circumference of which the clamping elements 3 are arranged in a uniformly distributed manner around a central axis, which is not shown in more detail, wherein the number of clamping elements 3 corresponds to the number of rotor blades 1 to be mounted on the rotor disk 2. Each clamping element 3 comprises a guide ring locating slot 14 which extends radially outward from the radially inner surface of the clamping element 3. Accordingly, each clamping element 3 can be seated upon the guide ring 13 from the outside, as is shown in FIG. 6. Each clamping element 3 also comprises a blade root locating slot 15 which are designed in the main similar to the blade root locating slots 12 of the rotor disk 2. The clamping elements 3 are radially movable between an outer position, which is shown in FIG. 4, and an inner position, which is shown in FIG. 5, exerting a defined force. The outer position is selected in such a way that rotor blades 1 retained on the clamping device 4 are arranged along a first pitch circle diameter $D_1$ which is larger than the predetermined pitch circle diameter D, and the inner position is selected in such a way that the rotor blades 1 are arranged along a second pitch circle diameter $D_2$ which corresponds to the predetermined pitch circle diameter D. The radial movement of the clamping elements 3 is carried out in the present case in a synchronized manner and can for example be brought about using a motor, especially a hydraulic motor. For fixing the clamping elements 3 in their inner radial position, the clamping elements 3 and the guide ring 13 are provided with corresponding through-holes 16, 17 through which a fixing pin 18 can be inserted.

For mounting the rotor blades 1 on the rotor disk 2, in a first step the rotor blades 1 are mounted in each case on an associated clamping element 3 of the clamping device 4 by the blade roots 5 being pushed into the associated blade root locating slots 15 of the clamping elements 3. The clamping elements 3 are located in this case in their outer radial position so that the rotor blades 1 are arranged along the first pitch circle diameter D1. In this position, the shrouds 7 of the rotor blades 1 do not touch each other.

In a second step, the clamping elements 3 are now moved radially inward in the direction of the inner radial position until the rotor blades 1 are arranged along the second pitch circle diameter $D_2$ which corresponds to the predetermined pitch circle diameter D. During this radial inward movement of the clamping elements 3 the shrouds 7 are gradually clamped against each other until reaching the second pitch circle diameter $D_2$ until a predetermined pretension is achieved. This is at least partially brought about by means of a twisting movement of the rotor blades 1 around their longitudinal axis which is attributable to the previously described offset of the middle lines 10 and 11 of the blade roots 5 and of the shrouds 7. As soon as the rotor blades are positioned along the second pitch circle diameter $D_2$, the clamping elements 3 are fixed in their position by the fixing pins 18 being inserted into the associated through-holes 16 and 17.

Figure 7:
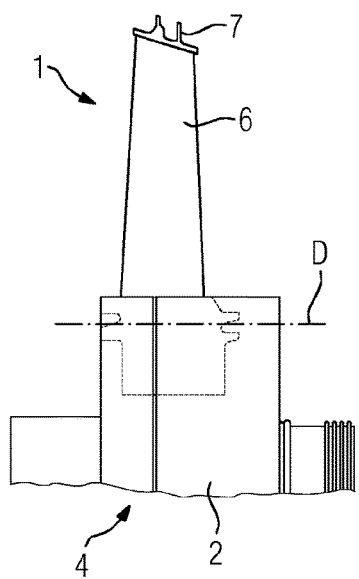
FIG. 7 shows a schematic side view of rotor blades which are retained on the clamping device shown in FIGS. 4 to 6 during the mounting on a rotor disk.
Figure 8:
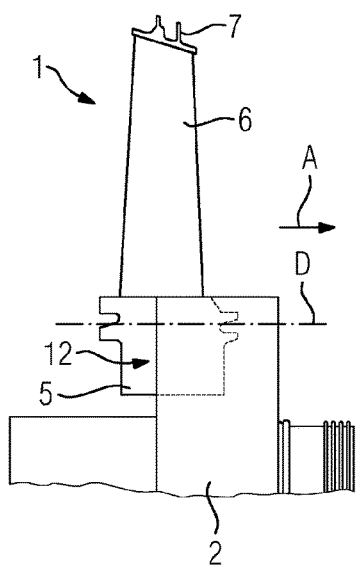
FIG. 8 shows a schematically side view which shows the arrangement according to FIG. 7 after removal of the clamping device.

The rotor blades 1 are then mounted on the rotor disk 2 in the pretensioned state. To this end, the clamping device 4 and the rotor disk 2 are oriented toward each other in such a way that their blade root locating slots 12, 15 are in alignment with each other so that the rotor blades 1 can be pushed from the clamping device 4 onto the rotor disk 2, as is shown in FIG. 7. In a further step, the clamping device 4 is then removed, as is shown in FIG. 8. The rotor blades 1 can now be pushed fully onto the rotor disk 2 and fixed on this.

The method according to the invention is especially distinguished by the fact that the rotor blades can be fixed without any problem on the rotor disk 2, realizing a large pretension. This is especially attributable to the radial clamping of the rotor blades 1 or of the shrouds 7 using the clamping device 4.

Although the invention has been fully illustrated and described in detail by the preferred exemplary embodiment, the invention is not limited by the disclosed examples and other variations can be derived therefrom by the person skilled in the art without departing from the extent of protection of the invention.

The invention claimed is:

1. A method for mounting rotor blades on a rotor disk along a predetermined pitch circle diameter in such a way that shrouds of adjacent rotor blades mounted on the rotor disk in the intended manner and in the cold state are clamped against each other with a predetermined pretension, wherein the method features the consecutive steps:
   a) mounting each rotor blade on an associated clamping element of a clamping device in such a way that the rotor blades are arranged along a first pitch circle diameter which is larger than the predetermined pitch circle diameter, wherein the shrouds of the rotor blades which are retained on the clamping elements are not clamped against each other or with a pretension which is lower than the predetermined pretension,
   b) moving the clamping elements radially inward until the rotor blades are arranged along a second pitch circle diameter which corresponds to the predetermined pitch circle diameter, wherein the shrouds of the rotor blades are clamped against each other during the radial inward movement of the clamping elements until achieving the predetermined pretension, and
   c) mounting the rotor blades on the rotor disk in that state in which the shrouds of the rotor blades are clamped against each other with the predetermined pretension.

2. The method as claimed in claim 1,
   wherein the predetermined pretension in step b) is at least partially created by means of a twisting movement of the rotor blades around their longitudinal axis.

3. The method as claimed in claim 1,
   wherein each rotor blade comprises a blade root,
   wherein the rotor disk and the clamping elements have in each case blade root locating slots, which are designed to correspond to the blade roots and which after carrying out step b) can be arranged in alignment with each other in such a way that the rotor blades which are retained on the clamping elements can be pushed out of the blade locating slots of the clamping device into the blade locating slots of the rotor disk in step c).

4. The method as claimed in claim 1,
   wherein the shrouds of adjacent rotor blades are provided on their radial end faces pointing toward each other with corresponding connecting elements which can be brought into engagement with each other in the radial direction and define an undercut in the axial direction.

5. The method as claimed in claim 4,
   wherein corresponding connecting elements are formed by a projection and by a recess which is designed to correspond to the projection.

6. The method as claimed in claim 5,
   wherein the projection extends in each case over the entire axial width of a shroud and especially has the shape of an arrow point which points in the circumferential direction.

7. A clamping device for implementing a method as claimed claim 1, comprising:
   a plurality of clamping elements which are arranged in a uniformly distributed manner around a central axis, the number of which corresponds to the number of rotor blades to be mounted on the rotor disk and which in each case are designed for the locating of a rotor blade,
   wherein for carrying out step b) the clamping elements can be moved radially, exerting a radially inwardly directed force.

8. The clamping device as claimed in claim 7,
   wherein the clamping elements are provided with blade root locating slots which are designed in each case for locating a blade root of a rotor blade.

9. The clamping device as claimed in claim 7,
   wherein provision is made for at least one locking device which is designed for locking the clamping elements which are arranged along the second pitch circle diameter.

* * * * *